(12) United States Patent
He et al.

(10) Patent No.: US 9,964,706 B2
(45) Date of Patent: May 8, 2018

(54) STRUCTURE OF AN INPUT END OF AN OPTICAL FIBER

(71) Applicant: BWT Beijing Ltd., Beijing (CN)

(72) Inventors: Xiaoguang He, Beijing (CN); Kuiyan Song, Beijing (CN); Lei Xu, Beijing (CN)

(73) Assignee: BWT Beijing Ltd., Beijing (CN)

( * ) Notice: Subject to any disclaimer, the term of this patent is extended or adjusted under 35 U.S.C. 154(b) by 65 days.

(21) Appl. No.: 15/127,281

(22) PCT Filed: Jan. 21, 2016

(86) PCT No.: PCT/CN2016/071598
§ 371 (c)(1),
(2) Date: Sep. 19, 2016

(87) PCT Pub. No.: WO2017/096697
PCT Pub. Date: Jun. 15, 2017

(65) Prior Publication Data
US 2018/0045888 A1    Feb. 15, 2018

(30) Foreign Application Priority Data
Dec. 8, 2015    (CN) .......................... 2015 1 0900201

(51) Int. Cl.
*G02B 6/26*    (2006.01)
*G02B 6/38*    (2006.01)
(Continued)

(52) U.S. Cl.
CPC .............. *G02B 6/26* (2013.01); *G02B 6/036* (2013.01); *G02B 6/38* (2013.01);
(Continued)

(58) Field of Classification Search
CPC . G02B 6/26; G02B 6/036; G02B 6/38; G02B 6/14; G02B 6/262; G02B 6/0008;
(Continued)

(56) References Cited

U.S. PATENT DOCUMENTS

5,729,643 A * 3/1998 Hmelar ................ G02B 6/2551
385/43
6,757,467 B1 * 6/2004 Rogers ................ G02B 6/4201
385/126
(Continued)

*Primary Examiner* — Akm Enayet Ullah (57) ABSTRACT

The present invention discloses a structure of an input end of an optical fiber, comprising a first optical fiber and a second optical fiber; wherein the first optical fiber and the second optical fiber are coaxial, one end of the first optical fiber is used to receive light beam, and the other end of the first optical fiber is engaged with the second optical fiber; wherein the first optical fiber comprises a fiber core and a first cladding; the second optical fiber comprises a fiber core and a first cladding; wherein a diameter of the first cladding of the first optical fiber is larger than a diameter of the first cladding of the second optical fiber and a difference between them is larger than a first preset threshold; wherein a diameter of the fiber core of the first optical fiber is smaller than or equal to a diameter of the fiber core of the second optical fiber and a difference between them is smaller than a second preset threshold. The structure of the input end of the optical fiber provided by the present invention has advantages such as simple structure, easy for implementation, high reliability; and can efficiently prevent light from entering the cladding of the optical fiber thus avoiding thermal damage to the optical fiber.

10 Claims, 4 Drawing Sheets

(51) Int. Cl.
*G02B 6/036* (2006.01)
*H01S 3/067* (2006.01)
*C03B 37/012* (2006.01)

(52) U.S. Cl.
CPC ........ *C03B 37/01211* (2013.01); *G02B 6/262* (2013.01); *H01S 3/0675* (2013.01); *H01S 3/06716* (2013.01)

(58) Field of Classification Search
CPC ............. G02B 6/02328; G02B 6/2551; G02B 6/4201; G02B 6/02304; G02B 6/02028; G02B 6/02242; G02B 6/2821; H01S 3/06716; H01S 3/06729; H01S 3/06733; H01S 3/0675
See application file for complete search history.

(56) References Cited

U.S. PATENT DOCUMENTS

| | | | |
|---|---|---|---|
| 8,009,948 B2* | 8/2011 | Digonnet | G02B 6/02304 359/333 |
| 8,089,689 B1* | 1/2012 | Savage-Leuchs | B29C 47/0026 359/341.1 |
| 2003/0108312 A1* | 6/2003 | Huang | G02B 6/14 385/123 |
| 2003/0210878 A1* | 11/2003 | Kumano | G02B 6/02028 385/127 |
| 2006/0078009 A1* | 4/2006 | Katayama | C03B 37/01211 372/6 |
| 2006/0126162 A1* | 6/2006 | Taniguchi | G02B 6/02242 359/334 |
| 2013/0243377 A1* | 9/2013 | Seo | G02B 6/2821 385/37 |

* cited by examiner

STRUCTURE OF AN INPUT END OF AN OPTICAL FIBER

CROSS-REFERENCE TO RELATED APPLICATIONS

This application is a National Stage of International Application No. PCT/CN2016/071598, filed on Jan. 21, 2016, which is based upon and claims priority to Chinese Patent Application No. 201510900201.1, filed on Dec. 8, 2015, the entire contents of both of which are incorporated herein by reference.

TECHNICAL FIELD

The present invention relates to the field of laser technology, particularly to a structure of an input end of an optical fiber.

DESCRIPTION OF RELATED ART

When a high-power laser is coupled into an optical fiber, if the size of the light spot of the incident light is larger than the diameter of the core of the optical fiber or the incident angle exceeds the numerical aperture angle of the optical fiber, a portion of light will enter the cladding of the optical fiber. The cladding light could damage the fiber tip if it leaks at the incident end, or burn the fiber if the cladding light is absorbed by the buffer layer when travelling along the fiber.

Figure 1:
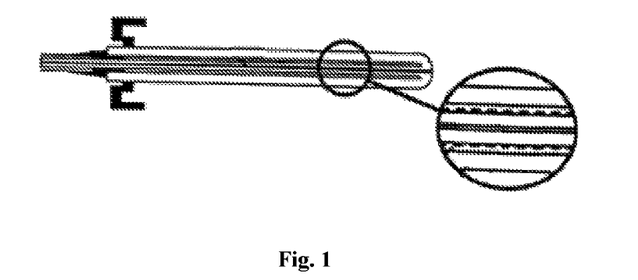
FIG. 1 is a schematic diagram showing a conventional structure of an input end of an optical fiber.

FIG. 1 shows a structure of an input end of the optical fiber disclosed in US 20100195957A1. As shown in FIG. 1, the optical fiber is protected by a transparent sleeve outside. Either the surface of the optical fiber is pretreated to be rough, or materials with refractive index equal to or greater than that of the fiber cladding are used to fill the gap between the sleeve and fiber. The refractive index of the transparent sleeve is equal to or greater than that of the cladding, the outer surface of the sleeve is processed to rough, and the length of the sleeve is long enough so that the residual light in the cladding, before reaching the end of the connector, can leak out of the optical fiber. This invention allows the light to escape from the connector without generating heat, which avoids the thermal damage to the connector.

The problems exist in this approach are roughening process may cause micro-cracks on the surface of the optical fiber, which may reduce the long-term reliability of the fiber, and the structure is complicated. There are also risks on burning of the filling materials between the sleeve and fiber due to the light leaked out.

Figure 2:
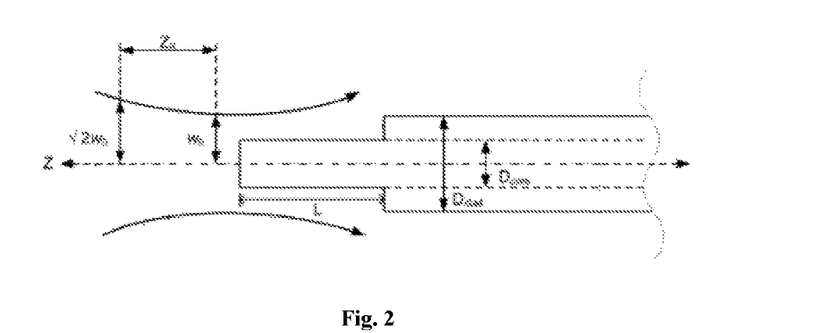
FIG. 2 is a schematic diagram showing another conventional structure of an input end of an optical fiber.

FIG. 2 shows another structure of an input end of the optical fiber disclosed in US 20120262938A1. As shown in FIG. 2, there is a fiber core extension with a length L at the end of the bare optical fiber. The core extension can be formed by removing a length of cladding from the fiber by etching or other processes. A certain thickness of the cladding can also be left on the core extension, where, for example, the thickness is smaller than ⅓, ⅕, 1/10, 1/20 or 1/100 of that of the cladding. By this way, the light coupled into the cladding due to the too large spot size or misalignment can be substantially eliminated.

The problems exist in this approach are etching is needed to remove the cladding, etching process causes the optical fiber to be fragile, which reduces the long-term reliability of the fiber, and the optical fiber after etching is too weak to go through cutting, grinding and other processes. In order to prevent the incident light from entering the cladding of the optical fiber through the end face of the cladding, the end face should also be modified by roughening, being coated with a reflective film or other processes, which is very difficult.

SUMMARY OF THE INVENTION

The present invention provides a structure of an input end of an optical fiber, which can solve the problems in prior arts or at least partially solve those problems.

In one embodiment, the structure of the input end of the optical fiber comprises a first optical fiber and a second optical fiber;

wherein the first optical fiber and the second optical fiber are coaxial, one end of the first optical fiber is used to receive optical beam, and the other end of the first fiber is engaged with the second optical fiber;

wherein the first optical fiber comprise a fiber core and a first cladding surrounding its fiber core; the second optical fiber comprise a fiber core and a first cladding surrounding its fiber core;

wherein a diameter of the first cladding of the first optical fiber is larger than a diameter of the first cladding of the second optical fiber and a difference between them is larger than a first preset threshold;

wherein a diameter of the fiber core of the first optical fiber is smaller than or equal to a diameter of the fiber core of the second optical fiber and a difference between them is smaller than a second preset threshold.

Alternatively, the structure of the input end of the optical fiber further comprises a second cladding of the first optical fiber surrounding the first cladding of the first optical fiber.

Alternatively, the diameter of the first cladding of the first optical fiber gradually and uniformly decreases from a preset position until the engagement of the first optical fiber and the second optical fiber.

Alternatively, the structure of the input end of the optical fiber further comprises an end cap;

wherein one end of the end cap is coated with an antireflection film, and the other end of the end cap is engaged with the one end of the first optical fiber, a material of the end cap is quartz or glass, and a diameter of the end cap is larger than the diameter of the fiber core of the first optical fiber.

Alternatively, the structure of the input end of the optical fiber further comprises a sleeve;

wherein the sleeve surrounds the first optical fiber and the second optical fiber, and a material of the sleeve is metal or glass;

wherein when the material of the sleeve is metal, a gap formed between an inner surface of the sleeve and an outer surface of the first cladding of the second optical fiber is filled with glue;

wherein when the material of the sleeve is glass, the gap formed between the inner surface of the sleeve and the outer surface of the first cladding of the second optical fiber is filled with glue, or the inner surface of the sleeve and the outer surface of the first cladding of the second optical fiber are welded by laser or electric arc.

Alternatively, an end face of the one end of the first optical fiber is coated with an antireflection film.

Alternatively, the other end of the first optical fiber is engaged with the second optical fiber by way of electrode discharge fusion, laser heating fusion or adhesive bonding.

Alternatively, a ratio of the diameter of the first cladding of the first optical fiber to the diameter of the fiber core of the first optical fiber is 1.1~50;

a difference of the diameter of the fiber core of the first optical fiber and the diameter of the fiber core of the second optical fiber is 2 times coaxial precision of the first optical fiber and the second optical fiber.

Alternatively, a length of the first optical fiber is 1 mm~3000 mm.

Alternatively, the first optical fiber is a single-mode optical fiber or a multimode optical fiber; the second optical fiber is a single-mode optical fiber or a multimode optical fiber;

the first optical fiber is a shaped optical fiber with D-shaped or square shaped fiber core and cladding, or the first optical fiber is a photonic crystal optical fiber; and the second optical fiber is a shaped optical fiber with D-shaped or square shaped fiber core and cladding, or the second optical fiber is a photonic crystal optical fiber.

It can be known from the above that, in the structure of the input end of the high-power optical fiber provided by the present invention, a length of optical fiber with a larger diameter is engaged at the front end of the optical fiber. The structure of the input end of the optical fiber has advantages such as simple structure, easy for implementation, high reliability. And it can efficiently prevent light from entering the cladding of the optical fiber so as to prevent light from converting into heat, thus avoiding thermal damage to the optical fiber.

DETAILED DESCRIPTION OF THE INVENTION

To make the objectives, technical solutions and advantages of the present invention clearer, the embodiments of the present invention will be further described in detail below in connection with the attached drawings.

Figure 3:
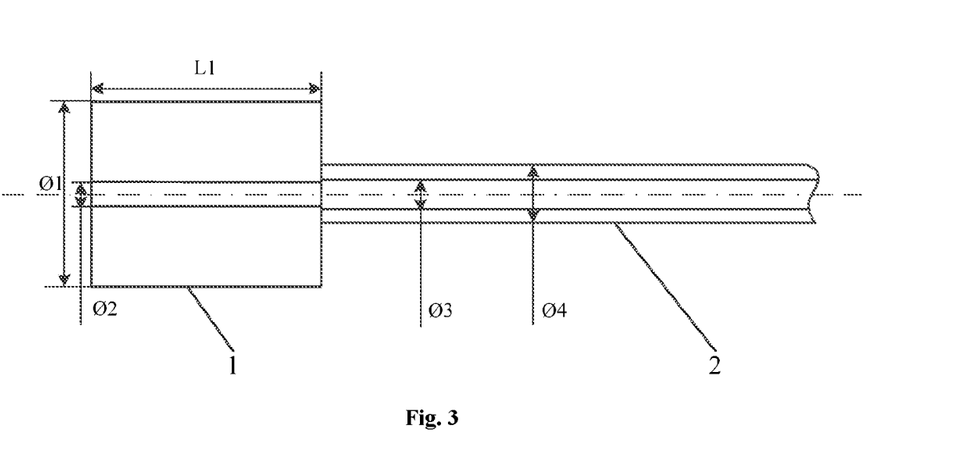
FIG. 3 is a schematic diagram showing a structure of an input end of an optical fiber according to Embodiment 1 of the present invention.

FIG. 3 is a schematic diagram showing a structure of an input end of an optical fiber according to Embodiment 1 of the present invention. As shown in FIG. 3, the structure of the input end of the optical fiber comprises a first optical fiber 1 and a second optical fiber 2; the first optical fiber 1 and the second optical fiber 2 are coaxial, one end of the first optical fiber 1 is used to receive light beam, and the other end of the first optical fiber 1 is engaged with the second optical fiber.

The first optical fiber 1 comprises a fiber core and a first cladding surrounding its fiber core; the second optical fiber 2 comprises a fiber core and a first cladding surrounding its fiber core. Wherein a diameter Ø1 of the first cladding of the first optical fiber is larger than a diameter Ø4 of the first cladding of the second optical fiber, and a difference between them is larger than a first preset threshold; a diameter Ø2 of the fiber core of the first optical fiber is smaller than or equal to a diameter Ø3 of the fiber core of the second optical fiber, and a difference between them is smaller than a second preset threshold.

Thus it can be seen that, in the structure of the input end of the optical fiber shown in FIG. 3, the diameter of the first cladding of the first optical fiber is larger than the diameter of the first cladding of the second optical fiber, so that most of lights entering the first cladding of the first optical fiber leak out of the first optical fiber and the second optical fiber and into outer space at the engagement of the first optical fiber and the second optical fiber, and only minor of the light enters the first cladding of the second optical fiber, which improves security of the structure of the input end of the optical fiber.

In one particular embodiment, both the first optical fiber 1 and the second optical fiber 2 are a multimode optical fiber, and the other end of the first optical fiber 1 is engaged with the second optical fiber 2 by way of electrode discharge fusion, laser heating fusion or adhesive bonding. A ratio Ø1/Ø2 of the diameter Ø1 of the first cladding of the first optical fiber to the diameter Ø2 of the fiber core of the first optical fiber is 1.1~50; the diameter Ø2 of the fiber core of the first optical fiber is smaller than or equal to the diameter Ø3 of the fiber core of the second optical fiber.

In order to substantially prevent light from entering the first cladding of the second optical fiber due to too large size of light spot or too large incident angle, a length L1 of the first optical fiber 1 should be larger than 1 mm. Under normal circumstances, the length L1 of the first optical fiber 1 can be selected from a range of 1 mm~3000 mm. In addition, as needed, the outer surface of the first optical fiber 1 can be processed by roughening so as to make light in the first cladding of the first optical fiber scatter out of the lateral surface of the optical fiber.

During specific processing of the structure of the end of the optical fiber, it is possible to cut the first optical fiber 1 into a length L1 after engaging the first optical fiber 1 with the second optical fiber 2, and then to process the end face of the first optical fiber 1 by grinding, polishing and so on and coating with an antireflection film; alternatively it is also possible to prepare a length L1 of the first optical fiber 1 firstly, and then processing an end face of the first optical fiber 1 by grinding, polishing and so on and coating with an antireflection film, before engaging the first optical fiber 1 with the second optical fiber 2 by fusion or bonding.

Since the technical problem to be solved by the technical solution provided by the present invention is that when a light spot size of incident light is larger than the diameter of the fiber core of the optical fiber or the incident angle is larger than the numerical aperture angle of the optical fiber, a part of the incident light entering the cladding of the optical fiber damages the optical fiber due to the thermal effects, the principle of the structure of the input end of the optical fiber provided by Embodiment 1 will be explained below in two cases that the light spot size of the incident light is larger than the diameter of the fiber core of the optical fiber and the incident angle is larger than the numerical aperture angle of the optical fiber.

Figure 4A:
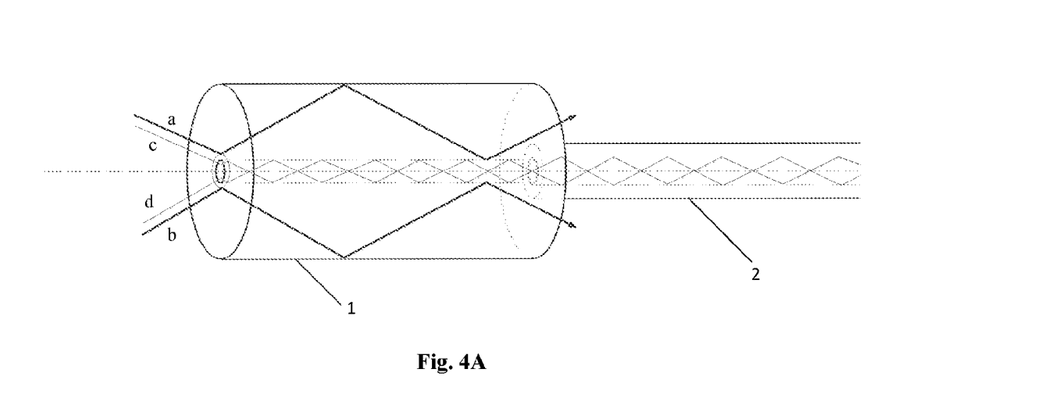
FIG. 4A is a schematic diagram showing an optical path in which an incident light enters the structure of the input end of the optical fiber according to one embodiment of the present invention.

FIG. 4A is a schematic diagram showing an optical path in which the incident light enters the structure of the input end of the optical fiber according to one embodiment of the present invention. As shown in FIG. 4A, when the light spot size of the incident light is larger than the diameter Ø2 of the fiber core of the first optical fiber 1 while the incident angle of the incident light meets the requirement of the numerical aperture angle of the optical fiber, marginal lights a, b of the incident light enter the first cladding of the first optical fiber and lights c, d of the incident light are coupled into the fiber core of the first optical fiber.

On the one hand, since the diameter of the first cladding of the first optical fiber is larger than the diameter of the first cladding of the second optical fiber, after the lights a, b entering the first cladding of the first optical fiber transmit a certain distance in the first cladding of the first optical fiber, most of them leak into the outer space from the rear end of the first cladding of the first optical fiber; on the other hand, the lights c, d coupled into the fiber core of the first optical fiber, after transmitting to the engagement of the first optical fiber 1 and the second optical fiber 2 by repeated total reflections in the fiber core of the first optical fiber, because the diameter of the fiber core of the first optical fiber is smaller than or equal to that of the fiber core of the second optical fiber, are further coupled into the fiber core of the second optical fiber so as to form stable transmission.

Figure 4B:
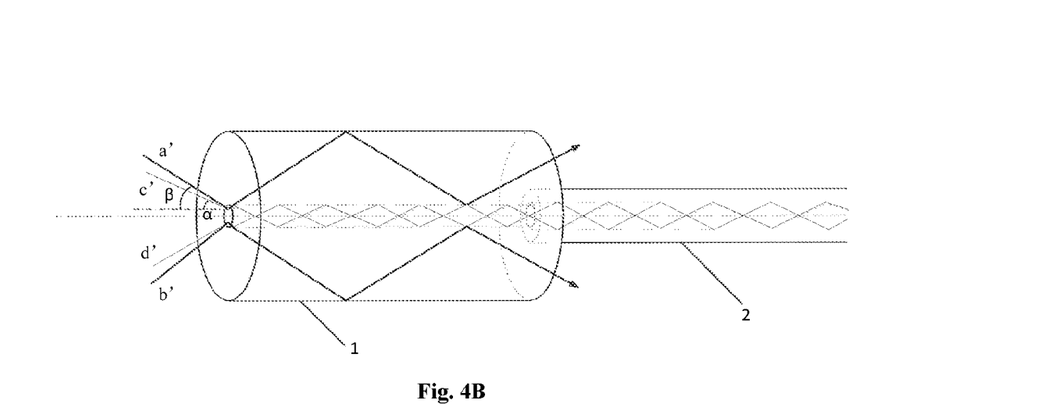
FIG. 4B is a schematic diagram showing an optical path in which an incident light enters the structure of the input end of the optical fiber according to another embodiment of the present invention.

FIG. 4B is a schematic diagram showing an optical path in which the incident light enters the structure of the input end of the optical fiber according to another embodiment of the present invention. As shown in FIG. 4B, when the incident angle β of the incident lights a', b' exceed the numerical aperture angle α of the first optical fiber 1 while the light spot size is smaller than the diameter Ø2 of the fiber core of the first optical fiber 1, the incident lights a', b', after entering the fiber core of the first optical fiber, leak into the first cladding of the first optical fiber because of not meeting total reflection condition; the incident lights c', d', the incident angle α of which meet the numerical aperture angle of the first optical fiber 1, are coupled into the fiber core of the first optical fiber.

On the one hand, since the diameter of the first cladding of the first optical fiber is larger than the diameter of the first cladding of the second optical fiber, after the lights a', b' entering the first cladding of the first optical fiber transmit a certain distance in the first cladding of the first optical fiber, most of them leak into the outer space from the rear end of the first cladding of the first optical fiber rather than entering the second optical fiber 2. On the other hand, the incident lights c', d', the incident angle of which is equal to or smaller than the numerical aperture angle α of the first optical fiber 1, will stably transmit in the fiber core of the first optical fiber, and after reaching the engagement of the first optical fiber 1 and the second optical fiber 2, because the diameter of the fiber core of the first optical fiber is smaller than or equal to that of the fiber core of the second optical fiber, the incident lights c', d' will be further coupled into the fiber core of the second optical fiber so as to form stable transmission.

Thus it can be seen that, in the structure of the input end of the optical fiber provided by Embodiment 1, a length of the first optical fiber 1 having a cladding of a large diameter is engaged at the front end of the second optical fiber 2 so that most of the lights entering into the first cladding of the first optical fiber leak out from the rear end of the first cladding of the first optical fiber 1, and only minor of them entering the first cladding of the second optical fiber from the rear end, which reduces the risk of the damage to the second optical fiber caused by the light in the cladding and improves the quality of the output light beam subjected to transmission in the optical fiber.

Figure 5:
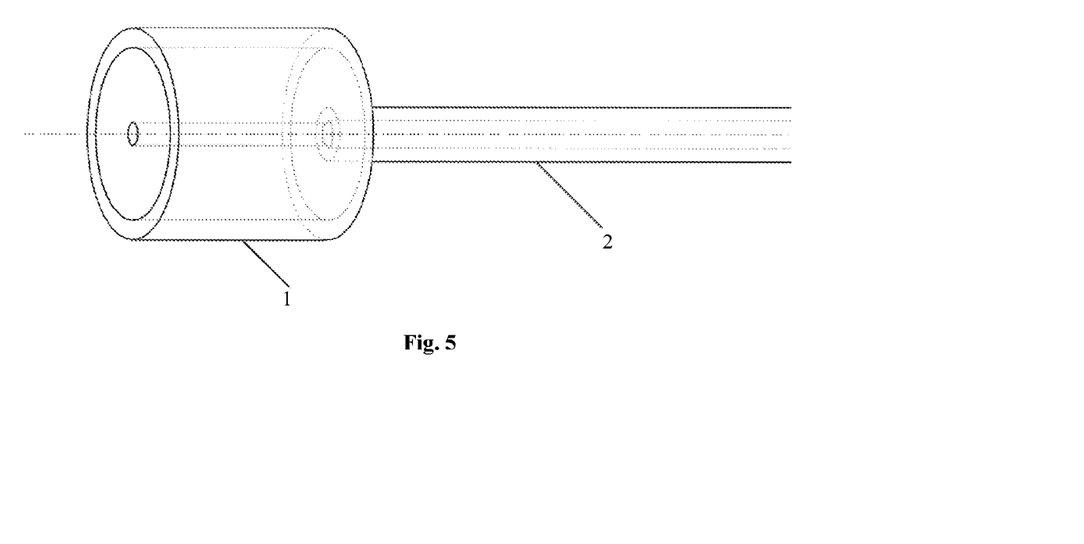
FIG. 5 is a schematic diagram showing a structure of an input end of an optical fiber according to Embodiment 2 of the present invention.

FIG. 5 is a schematic diagram showing a structure of an input end of the optical fiber according to Embodiment 2 of the present invention. As shown in FIG. 5, the structure of the input end of the optical fiber comprises a first optical fiber 1 and a second optical fiber 2; the first optical fiber 1 and the second optical fiber 2 are coaxial, one end of the first optical fiber 1 is used to receive optical beam, and the other end of the first optical fiber 1 is engaged with the second optical fiber.

In the present embodiment, the first optical fiber 1 comprises a fiber core, a first cladding surrounding the fiber core of the first optical fiber and a second cladding surrounding the first cladding of the first optical fiber; the refractive index n of the fiber core of the first optical fiber, the refractive index n1 of the first cladding of the first optical fiber and the refractive index n2 of the second cladding of the first optical fiber can meet several relationships as follows: n2≥n and n1<n, n>n1>n2, or n>n2>n1; the second optical fiber 2 comprises a fiber core and a first cladding surrounding the fiber core of the second optical fiber. Wherein a diameter Ø1 of the first cladding of the first optical fiber is larger than a diameter Ø4 of the first cladding of the second optical fiber, and a difference between them is larger than a first preset threshold; the diameter Ø2 of the fiber core of the first optical fiber is smaller than or equal to the diameter Ø3 of the fiber core of the second optical fiber, and a difference between them is smaller than a second preset threshold.

In one specific embodiment, both the first optical fiber 1 and the second optical fiber 2 are a multimode optical fiber, and the other end of the first optical fiber 1 is engaged with the second optical fiber 2 by way of electrode discharge fusion, laser heating fusion or adhesive bonding. A ratio Ø1/Ø2 of the diameter Ø1 of the first cladding of the first optical fiber to the diameter Ø2 of the fiber core of the first optical fiber is 1.1~50; the diameter Ø2 of the fiber core of the first optical fiber is smaller than or equal to the diameter Ø3 of the fiber core of the second optical fiber; the length L1 of the first optical fiber 1 is 1 mm~3000 mm.

When a light spot size of incident light is larger than the diameter Ø2 of the fiber core of the first optical fiber 1 or the incident angle of the incident light is larger than the numerical aperture angle of the first optical fiber 1, a part of the incident light enters the first cladding of the first optical fiber, and total reflection takes place at the interface of the first cladding and the second cladding of the first optical fiber and the part of the incident light returns back to the first cladding of the first optical fiber. Such a process repeats and at last the part of the incident light leaks out from the end of the first cladding of the first optical fiber. In the present embodiment, due to the restriction effect of the double-cladding structure to the light, only minor of light can leak out from the lateral surface of the first optical fiber 1 and most of light leaks out from the end of the cladding of the first optical fiber 1. In other embodiments, the first optical fiber 1 can also be of a structure with multi-claddings, such as three-cladding structure, four-cladding structure and so on, the principle of which is the same as that of the above described double-cladding structure, which will not be repeated here.

Alternatively, when the first optical fiber 1 is an optical fiber with multi-claddings, the second optical fiber 2 can also be an optical fiber with multi-claddings. In such a case, the following conditions need to be met: the diameter of the first cladding of the first optical fiber should be larger than the diameter of the outermost cladding of the second optical fiber 2, and the diameter of the fiber core of the first optical fiber should be smaller than or equal to the diameter of the fiber core of the second optical fiber.

Figure 6:
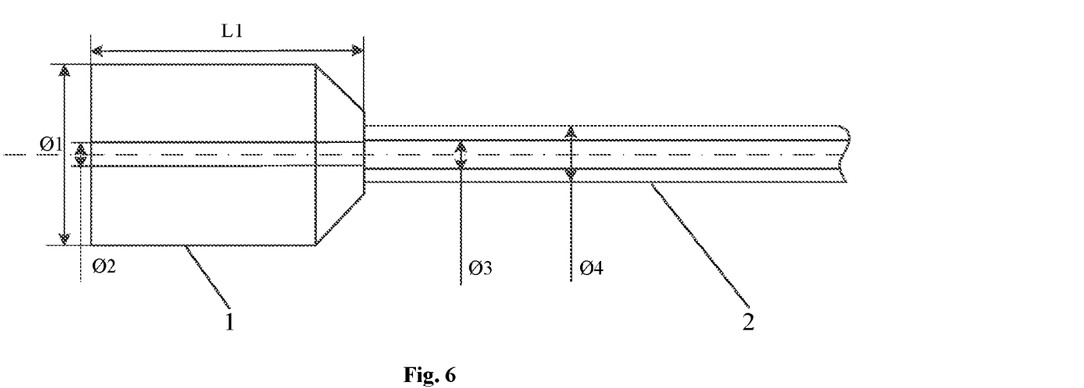
FIG. 6 is a schematic diagram showing a structure of an input end of an optical fiber according to Embodiment 3 of the present invention.

FIG. 6 is a schematic diagram showing a structure of an input end of the optical fiber according to Embodiment 3 of the present invention. As shown in FIG. 6, the structure of the input end of the optical fiber comprises a first optical fiber 1 and a second optical fiber 2; the first optical fiber 1 and the second optical fiber 2 are coaxial, one end of the first optical fiber 1 is used to receive optical beam, and the other end of the first optical fiber 1 is engaged with the second optical fiber.

In the present embodiment, the first optical fiber 1 comprises a fiber core and a first cladding surrounding the fiber core of the first optical fiber; the second optical fiber 2 comprises a fiber core and a first cladding surrounding the fiber core of the second optical fiber. Wherein a diameter Ø2 of the fiber core of the first optical fiber is smaller than or equal to a diameter Ø3 of the fiber core of the second optical fiber, and a difference between them is smaller than a second preset threshold; in the axial direction of the first optical fiber 1, a preset position is determined, for example, the axial distance from this preset position to one end of the first optical fiber 1 is equal to ¾ of the length of the first optical fiber 1, the diameter Ø1 of the first cladding of the first optical fiber from the one end of the first optical fiber 1 to this preset position remains constant which is larger than the diameter Ø4 of the first cladding of the second optical fiber, a difference of them is larger than a first preset threshold; the diameter of the first cladding of the first optical fiber from this preset position to the other end of the first optical fiber 1 decreases gradually and uniformly until the engagement of the first optical fiber 1 and second optical fiber 2 so that the diameter of the first cladding of the first optical fiber at the engagement of the first optical fiber 1 and the second optical fiber 2 is still larger than the diameter of the first cladding of the second optical fiber.

Alternatively, both the first optical fiber 1 and the second optical fiber 2 are a multimode optical fiber, and the other end of the first optical fiber 1 is engaged with the second optical fiber 2 by way of electrode discharge fusion, laser heating fusion or adhesive bonding. A ratio Ø1/Ø2 of the diameter Ø1 of the first cladding of the first optical fiber to the diameter Ø2 of the fiber core of the first optical fiber is 1.1~50; the diameter Ø2 of the fiber core of the first optical fiber is smaller than or equal to the diameter Ø3 of the fiber core of the second optical fiber; the length L1 of the first optical fiber 1 is 1 mm~3000 mm.

In the structure of the end portion of the optical fiber provided by the present embodiment, one end of the first cladding of the first optical fiber is processed into an inclined surface to make the leaked lights more divergent and reduce back reflection.

Furthermore, in other embodiments, some transparent and non-absorbing glue can also be evenly placed at the engagement of the first optical fiber 1 and the second optical fiber 2. Preferably, the glue at the interface shapes as conical. In this way, an inclined surface can also be formed at one end of the first optical fiber 1, and it is easier to implement in processes relative to processing an inclined surface at the end of the optical fiber.

Figure 7:
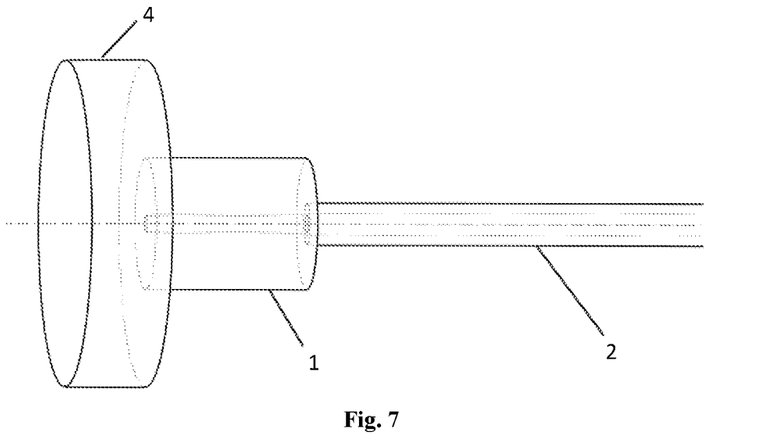
FIG. 7 is a schematic diagram showing a structure of an input end of an optical fiber according to Embodiment 4 of the present invention.

FIG. 7 is a schematic diagram showing a structure of an input end of the optical fiber according to Embodiment 4 of the present invention. As shown in FIG. 7, the structure of the input end of the optical fiber comprises a first optical fiber 1, a second optical fiber 2 and an end cap 4; the first optical fiber 1 and the second optical fiber 2 are coaxial, one end of the end cap 4 is coated with an antireflection film, and the other end of the end cap 4 is engaged with one end of the first optical fiber 1, and the other end of the first optical fiber 1 is engaged with the second optical fiber.

The first optical fiber 1 comprises a fiber core and a first cladding surrounding the fiber core of the first optical fiber; the second optical fiber 2 comprises a fiber core and a first cladding surrounding the fiber core of the second optical fiber. Wherein a material of the end cap 4 is quartz or glass, and a diameter of the end cap 4 is larger than a diameter Ø2 of the fiber core of the first optical fiber, a diameter Ø1 of the first cladding of the first optical fiber is larger than a diameter Ø4 of the first cladding of the second optical fiber, and a difference between them is larger than a first preset threshold; the diameter Ø2 of the fiber core of the first optical fiber is smaller than or equal to a diameter Ø3 of the fiber core of the second optical fiber, and a difference between them is smaller than a second preset threshold.

Alternatively, both the first optical fiber 1 and the second optical fiber 2 are a multimode optical fiber, and the other end of the first optical fiber 1 is engaged with the second optical fiber 2 by way of electrode discharge fusion, laser heating fusion or adhesive bonding. A ratio Ø1/Ø2 of the diameter Ø1 of the first cladding of the first optical fiber to the diameter Ø2 of the fiber core of the first optical fiber is 1.1~50; the diameter Ø2 of the fiber core of the first optical fiber is smaller than or equal to the diameter Ø3 of the fiber core of the second optical fiber; a length L1 of the first optical fiber 1 is 1 mm~3000 mm.

Compared with the previous embodiments, in the present embodiment, the end cap 4 without any fiber core is added at the front end of the first optical fiber 1, which helps to reduce the optical power density at the incident end and avoid the damage to the end face of the optical fiber when the incident laser is of high-power.

Figure 8:
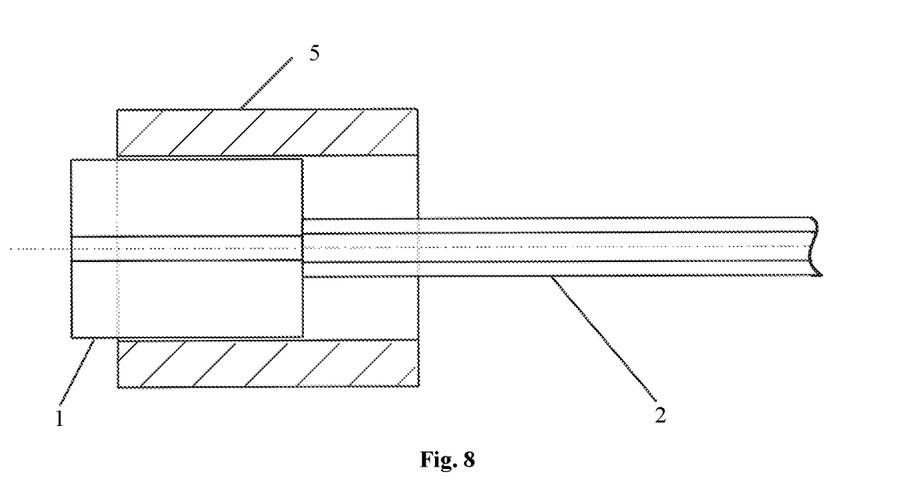
FIG. 8 is a schematic diagram showing a structure of an input end of an optical fiber according to Embodiment 5 of the present invention.

FIG. 8 is schematic diagram showing a structure of an input end of the optical fiber according to Embodiment 5 of the present invention. As shown in FIG. 8, the structure of the input end of the optical fiber comprises a first optical fiber 1, a second optical fiber 2 and a sleeve 5; the first optical fiber 1 and the second optical fiber 2 are coaxial, one end of the first optical fiber 1 is used to receive optical beam, and the other end of the first optical fiber 1 is engaged with the second optical fiber; the sleeve 5 surrounds the first optical fiber 1 and the second optical fiber 2.

The first optical fiber 1 comprises a fiber core and a first cladding surrounding the fiber core of the first optical fiber; the second optical fiber 2 comprises a fiber core and a first cladding surrounding the fiber core of the second optical fiber. Wherein a material of the sleeve 5 is metal or glass, and if the material of the sleeve 5 is metallic material such as copper, then it can also have an effect of heat dissipation; a gap formed between the inner surface of the sleeve 5 and the outer surface of the first cladding of the second optical fiber is filled with glue or the sleeve 5 and the first cladding of the second optical fiber are welded together to protect and fix the second optical fiber 2; the diameter Ø1 of the first cladding of the first optical fiber is larger than the diameter Ø4 of the first cladding of the second optical fiber, a difference of them is larger than a first preset threshold; the diameter Ø2 of the fiber core of the first optical fiber is smaller than or equal to the diameter Ø3 of the fiber core of the second optical fiber, and a difference between them is smaller than a second preset threshold.

Alternatively, both the first optical fiber 1 and the second optical fiber 2 are a multimode optical fiber, and the other end of the first optical fiber 1 is engaged with the second optical fiber 2 by way of electrode discharge fusion, laser heating fusion or adhesive bonding. A ratio Ø1/Ø2 of the diameter Ø1 of the first cladding of the first optical fiber to the diameter Ø2 of the fiber core of the first optical fiber is 1.1~50; the diameter Ø2 of the fiber core of the first optical fiber is smaller than or equal to the diameter Ø3 of the fiber core of the second optical fiber; and a length L1 of the first optical fiber 1 is 1 mm~3000 mm.

To sum up, in the structure of the input end of the high-power optical fiber provided by the present invention, a length of optical fiber with a larger diameter is engaged at the front end of the optical fiber. The structure of the input end of the optical fiber has advantages such as simple structure, easy for implementation, high reliability, and can efficiently prevent light from entering the cladding of the optical fiber so as to prevent light from converting into heat, thus avoiding the thermal damage to the optical fiber.

What described above are only preferred embodiments of the present invention, and not intended to limit the protection scope of the present invention. Any modification, equivalent replacement, improvement and so on made within the spirit and principle of the present invention made, are encompassed within the protection scope of the present invention.

The invention claimed is:

1. A structure of an input end of an optical fiber, comprising a first optical fiber and a second optical fiber;
   wherein the first optical fiber and the second optical fiber are coaxial, one end of the first optical fiber is used to receive light beam, and the other end of the first optical fiber is engaged with the second optical fiber;
   wherein the first optical fiber comprises a fiber core and a first cladding surrounding its fiber core; the second optical fiber comprises a fiber core and a first cladding surrounding its fiber core;
   wherein a diameter of the first cladding of the first optical fiber is larger than a diameter of the first cladding of the second optical fiber and a difference between them is larger than a first preset threshold; and
   wherein a diameter of the fiber core of the first optical fiber is smaller than or equal to a diameter of the fiber core of the second optical fiber and a difference between them is smaller than a second preset threshold.

2. The structure according to claim 1, further comprising a second cladding of the first optical fiber surrounding the first cladding of the first optical fiber.

3. The structure according to claim 1, wherein the diameter of the first cladding of the first optical fiber gradually and uniformly decreases from a preset position until the engagement of the first optical fiber and the second optical fiber.

4. The structure according to claim 1, further comprising an end cap;
   wherein one end of the end cap is coated with an antireflection film, and the other end of the end cap is engaged with the one end of the first optical fiber, a material of the end cap is quartz or glass, and a diameter of the end cap is larger than the diameter of the fiber core of the first optical fiber.

5. The structure according to claim 1, further comprising a sleeve;
   wherein the sleeve surrounds the first optical fiber and the second optical fiber, and a material of the sleeve is metal or glass;
   wherein when the material of the sleeve is metal, a gap formed between an inner surface of the sleeve and an outer surface of the first cladding of the second optical fiber is filled with glue; and
   wherein when the material of the sleeve is glass, the gap formed between the inner surface of the sleeve and the outer surface of the first cladding of the second optical fiber is filled with glue, or the inner surface of the sleeve and the outer surface of the first cladding of the second optical fiber are welded by laser or electric arc.

6. The structure according to claim 1, wherein an end face of the one end of the first optical fiber is coated with an antireflection film.

7. The structure according to claim 1, wherein the other end of the first optical fiber is engaged with the second optical fiber by way of electrode discharge fusion, laser heating fusion or adhesive bonding.

8. The structure according to claim 1, wherein a ratio of the diameter of the first cladding of the first optical fiber to the diameter of the fiber core of the first optical fiber is 1.1~50.

9. The structure according to claim 1, wherein a length of the first optical fiber is 1 mm~3000 mm.

10. The structure according to claim 1, wherein the first optical fiber is a single-mode optical fiber or a multimode optical fiber; the second optical fiber is a single-mode optical fiber or a multimode optical fiber; the first optical fiber is a shaped optical fiber with D-shaped or square shaped fiber core and cladding, or the first optical fiber is a photonic crystal optical fiber; and
the second optical fiber is a shaped optical fiber with D-shaped or square shaped fiber core and cladding, or the second optical fiber is a photonic crystal optical fiber.

* * * * *